US008649541B2

(12) United States Patent
Newton et al.

(10) Patent No.: US 8,649,541 B2
(45) Date of Patent: Feb. 11, 2014

(54) HEARING AID WITH MAGNETOSTRICTIVE ELECTROACTIVE SENSOR

(75) Inventors: James R. Newton, Burnsville, MN (US); Michael Karl Sacha, Chanhassen, MN (US); Wei Li Lin, Plymouth, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 196 days.

(21) Appl. No.: 13/179,784

(22) Filed: Jul. 11, 2011

(65) Prior Publication Data

US 2013/0016862 A1 Jan. 17, 2013

(51) Int. Cl.
H04R 25/00 (2006.01)
(52) U.S. Cl.
USPC ............. 381/323; 381/190; 381/331; 607/51; 600/25
(58) Field of Classification Search
USPC ......... 381/323, 190, 173, 314, 331, 328, 315, 381/312; 320/107, 108, 114; 136/205; 429/96, 98, 100; 600/25; 607/51–57
See application file for complete search history.

(56) References Cited

U.S. PATENT DOCUMENTS

| 4,379,988 | A | | 4/1983 | Mattatall |
| 5,659,621 | A | * | 8/1997 | Newton ........................ 381/312 |
| 5,749,909 | A | * | 5/1998 | Schroeppel et al. ............ 607/33 |
| 6,636,017 | B2 | | 10/2003 | Zink et al. |
| 6,658,124 | B1 | | 12/2003 | Meadows |
| 6,661,197 | B2 | | 12/2003 | Zink et al. |
| 7,068,804 | B2 | * | 6/2006 | Batting ........................ 381/330 |
| 7,561,708 | B2 | * | 7/2009 | Rohrlein ....................... 381/315 |
| 7,808,236 | B1 | * | 10/2010 | Huang et al. .................. 324/249 |
| 2008/0205678 | A1 | * | 8/2008 | Boguslavskij et al. ....... 381/312 |
| 2009/0167115 | A1 | | 7/2009 | Tucker et al. |

OTHER PUBLICATIONS

"Wireless Power Transfer: Magnetostrictive Electroactive WPT", Ferro Solutions Data Seet 20080530, (Jun. 2008), 2 pgs.
"Wireless Power Transfer: Magnetostrictive Electroactive WPT", Ferro Solutions Data Seet 20090517, (May 2009), 2 pgs.
Huang, J. K, et al., "Novel Sensor Based on Magnetostrictive/Piezoelectric Laminations", Sensor Lett. vol. 5, No. 1, (2007), 5 pgs.
O'Handley, R. C, "Improved Wireless, Transcutaneous Power Transmission for In Vivo Applications", IEEE Manuscript No. Sensors-01735-2007.R1, (2007), 11 pgs.

* cited by examiner

*Primary Examiner* — Davetta W Goins
*Assistant Examiner* — Oyesola C Ojo
(74) *Attorney, Agent, or Firm* — Schwegman Lundberg & Woessner, P.A.

(57) ABSTRACT

A hearing aid includes a magnetostrictive electroactive (ME) sensor that generates an electrical signal in response to a magnetic field or a mechanical pressure. In various embodiments, the ME sensor is used for cordless charging of a rechargeable battery in the hearing aid by generating an electrical signal in response to a magnetic field generated for power transfer, magnetic sound signal reception, and/or detection of user commands by sensing a magnetic field or a pressure applied to the hearing aid.

27 Claims, 11 Drawing Sheets

HEARING AID WITH MAGNETOSTRICTIVE ELECTROACTIVE SENSOR

TECHNICAL FIELD

This document relates generally to hearing assistance systems and more particularly to a hearing aid that includes a magnetostrictive electroactive (ME) sensor for receiving power, sound, and/or user commands.

BACKGROUND

Hearing aids are used to assist patients suffering hearing loss by transmitting amplified sounds to ear canals. In one example, a hearing aid is worn in and/or around a patient's ear. Patients generally prefer that their hearing aids are minimally visible or invisible, do not interfere with their daily activities, and easy to maintain. One difficulty in providing such hearing aids is associated with power supply. The battery of a hearing aid occupies a substantial portion of the device and/or requires frequent replacement. Use of a rechargeable battery reduces the cost and replacement frequency associated with a non-rechargeable battery. Cordless charging technology provides the patient with an easy way to recharge the hearing aid. However, the rechargeable battery and its charging circuitry present a significant challenge in the minimization of the hearing aid. The cordless charging, while convenient to operate, may require a charging circuitry of significant size in the hearing aid and/or a lengthy period for the battery to be fully recharged. Thus, there is a need for providing a hearing aid with a power supply that is small, efficient, and easy to maintain.

SUMMARY

A hearing aid includes a magnetostrictive electroactive (ME) sensor that generates an electrical signal in response to a magnetic field or a mechanical pressure. In various embodiments, the ME sensor is used for cordless charging of a rechargeable battery in the hearing aid by generating an electrical signal in response to a magnetic field generated for power transfer, magnetic sound signal reception (for example, as a telecoil), and/or detection of user commands by sensing a magnetic field or a pressure applied to the hearing aid.

In one embodiment, a hearing aid includes a hearing aid circuit, a rechargeable battery, an ME sensor, and a sensor processing circuit. The hearing aid circuit is powered by the rechargeable battery and includes a microphone, a receiver, and an audio processor coupled between the microphone and the receiver. The ME sensor generates a power signal in response to a magnetic field and generates a driving signal in response to another magnetic field or a pressure. The sensor processing circuit includes a battery charging circuit and a switch. The battery charging circuit charges the rechargeable battery using the power signal. The switch controls the hearing aid circuit using the driving signal.

In one embodiment, a method for operating a hearing aid is provided. A power signal is generated in response to a magnetic field applied to the hearing aid using an ME sensor in the hearing aid. The power signal is converted into a DC electrical signal that is used to charge the rechargeable battery. A user command being another magnetic field or a pressure applied to the hearing aid is detected using the ME sensor. The operation of the hearing aid is adjusted in response to the user command.

In one embodiment, a hearing aid includes a hearing aid circuit, a rechargeable battery, an ME sensor, and a battery charging circuit. The hearing aid circuit is powered by the rechargeable battery and includes a microphone, a receiver, and an audio processor coupled between the microphone and the receiver. The ME sensor scavenges power from magnetic fields generated from electric power lines and generates a power signal using the scavenged power. The battery charging circuit charges the rechargeable battery using the power signal.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

Figure 1:
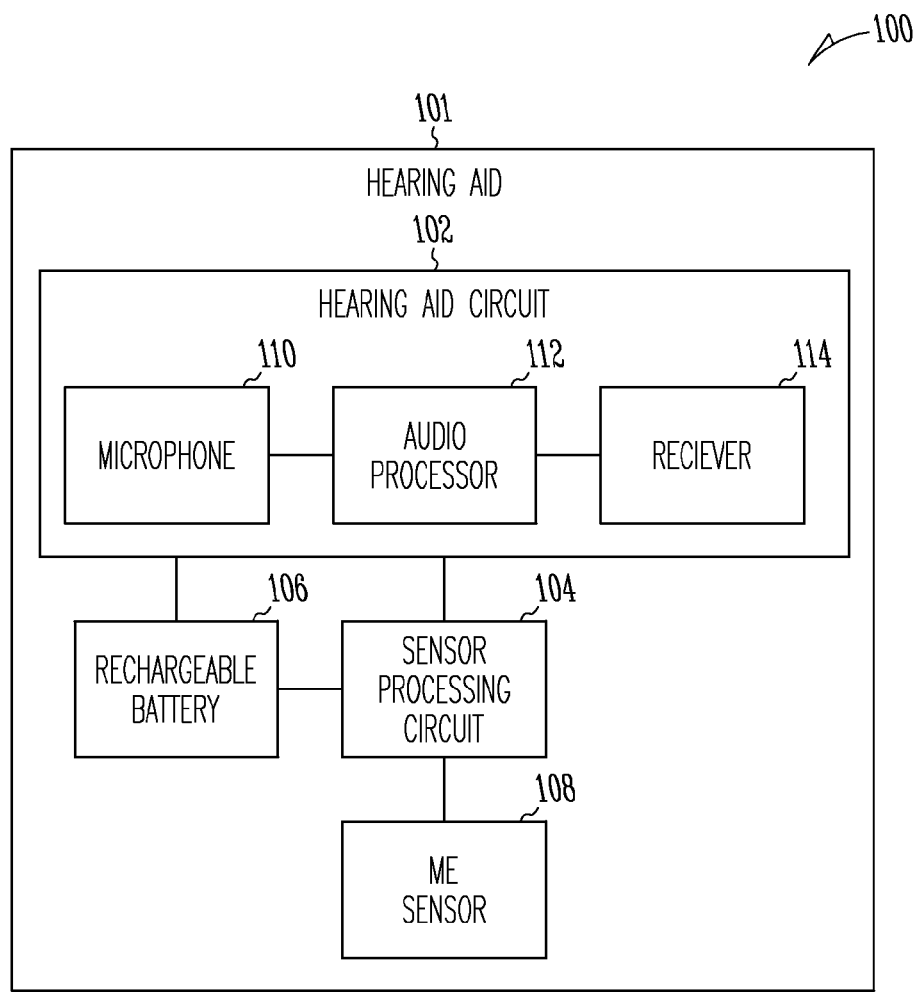
FIG. 1 is a block diagram illustrating an embodiment of a hearing aid including a magnetostrictive electroactive (ME) sensor.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

This document discusses a hearing assistance system including a rechargeable hearing aid and a hearing aid charger. The rechargeable hearing aid is a hearing aid powered by a rechargeable battery. The hearing aid charger provides for cordless (wireless) charging of the rechargeable battery.

A known method of cordless charging is inductive charging in which power is transmitted from the hearing aid charger to the hearing aid through an inductive couple. The inductive couple is formed by a primary (transmitting) coil in the hearing aid charger placed in proximity of a secondary (receiving) coil in the hearing aid. The required size of the secondary coil has been a substantial limiting factor when miniaturization of the hearing aid is desired. The secondary coil must be large enough for transferring sufficient power from the primary coil to charge the rechargeable battery in a reasonable amount of time. The recharging period required for fully recharging the hearing aid through an inductive couple may be about 6-8 hours, while a much shorter period such as about 1 hour is often desirable. The charging period may be shortened by increasing the diameter of the secondary coil, increasing the number of turns of the secondary coil, increasing the size of the wire used to form the secondary coil, and/or adding a permeable core to the secondary coil. However, each of these approaches increases the size of the secondary coil and hence the minimum size of the hearing aid. The charging period may also be shortened by increasing the power transmitted from the primary coil. However, this increases the risk of damaging the hearing aid due to excessive inductive heating of the sensitive components and/or the strength of the magnetic field applied to the sensitive components.

The small package size of a hearing aid thus limits power receivable through the inductive couple by limiting the size of the secondary coil and the amount of power that can be safely transmitted from the primary coil. In addition, alignment and spacing between the primary coil and the secondary coil have a substantial effect on the power transfer efficiency of the inductive couple, but a requirement for precise alignment and spacing constrains mechanical design of the hearing assistance system and may be undesirable by the hearing aid users. Thus, use of the inductive charging becomes a substantial limiting factor in decreasing the size of rechargeable hearing aids, decreasing the hearing aid recharging period, and/or easing the requirement on the alignment and spacing between the rechargeable hearing aid and its charger.

The present hearing aid system replaces the secondary coil with a magnetostrictive electroactive (ME) sensor in the hearing aid. The ME sensor receives power transmitted from the primary coil in the hearing aid charger. In various embodiments, the ME sensor may also be used as a telecoil that receives a magnetic field representing a sound, a magnetic sensor that senses presence of a magnet used for adjusting the hearing aid, and/or a touch sensor that allows a user to control the hearing aid by touching. In this document, a "user" includes a wearer of a hearing aid or a person assisting the wearer in using the hearing aid.

An ME sensor is made of magnetostrictive and piezoelectric materials. When a magnetic field is applied to the ME sensor, the magnetostrictive material mechanically deforms to stress the piezoelectric material into generating an electrical energy. This type of device is capable of being made to provide a high volumetric efficiency when converting a magnetic energy to an electrical energy. This high efficiency allows for greater separation between elements of the power transfer system, a smaller size of the power receiving elements in the hearing aid, and/or a smaller amount of power being transmitted from the primary coil.

Additionally, an ME sensor has a thin, planar construction that allows for its fabrication in various shapes, thus providing for great flexibility in the mechanical design of the hearing aid. The ME sensor has a structure that also acts as a flux guide that makes its orientation relative to the primary coil less critical than that of the secondary coil in an inductive couple.

Therefore, replacing the secondary coil in an inductive couple with an ME sensor allows for reducing the size of the power receiving circuitry contained in the hearing aid, increasing the power available for charging the rechargeable battery in the hearing aid, increasing power transfer efficiency, increasing tolerance in alignment between power transmitting and receiving elements, and/or reducing hearing aid component count by using the ME sensor to perform multiple functions in addition to power reception. This will result in additional room for additional components in a hearing aid, smaller hearing aid size, broadened application of rechargeable batteries in hearing aids of various types and styles, reduced time for recharging a hearing aid, and/or reduced constraints on mechanical design of a hearing aid. Such results will benefit the hearing aid wearers and increase customer satisfaction.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard, open fitted or occlusive fitted. It is understood that other hearing assistance devices not expressly stated herein may be used in conjunction with the present subject matter.

FIG. 1 is a block diagram illustrating an embodiment of a hearing aid 100 including an ME sensor 108. ME sensor 108 senses magnetic fields and mechanical pressure applied to hearing aid 100, and generates electrical signals in response. Hearing aid 100 includes a hearing aid circuit 102, a sensor processing circuit 104, and a rechargeable battery 106, in addition to ME sensor 108.

Hearing aid circuit 102 includes a microphone 110 to receive an audio signal, an audio processor 112 to process the audio signal, and a receiver (speaker) 114 to deliver the processed audio signal to the ear canal of the wearer of hearing aid 100. In one embodiment, audio processor 112 includes a digital signal processor. Rechargeable battery 106 provides hearing aid 100 with electrical power for its operation. Examples of rechargeable battery include nickel metal hydride, nickel cadmium, lithium air, lithium ion (standard, thin-film or nano-structure), lithium polymer (standard or advanced), lithium sulphur, silver-zinc, and super capacitor type batteries. Sensor processing circuit 104 processes the electrical signal generated by ME sensor 108. In various embodiments, sensor processing circuit 104 converts the electrical signal into a DC signal suitable for charging rechargeable battery 106, processes the electrical signal to recover a sound to be delivered to the wearer's ear canal, and/or detects a user command from the electrical signal for controlling operation of hearing aid 100.

In the illustrated embodiment, hearing aid 100 includes a housing 101 that encapsulates at least portions of hearing aid circuit 102, sensor processing circuit 104, rechargeable battery 106, and ME sensor 108. In various embodiments, ME sensor 108 is encapsulated in housing 101, is incorporated into housing 101, or forms a portion of housing 101. In various embodiments, depending on size and shape of the housing, hearing aid 100 is a BTE, ITE, ITC, RIC, CIC, or any other type device.

Figure 2:
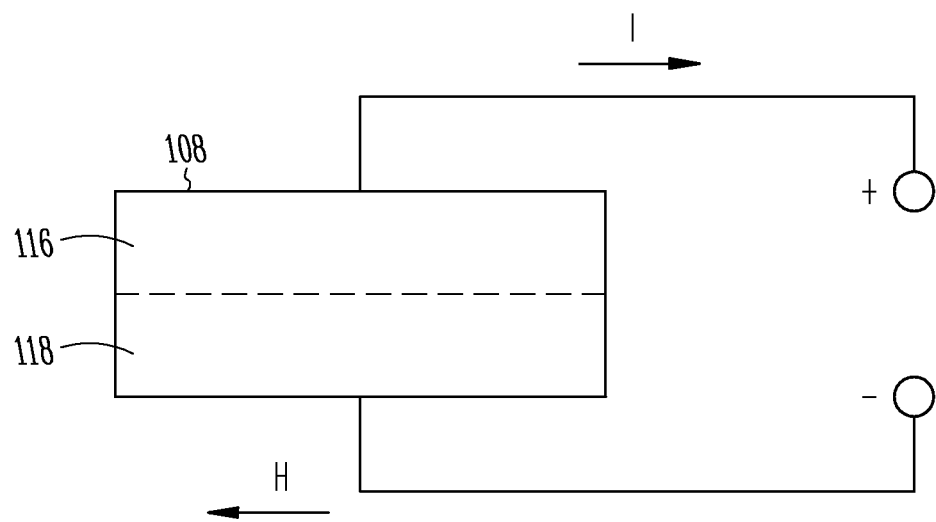
FIG. 2 is diagram illustrating a concept of the ME sensor.

FIG. 2 is diagram illustrating a concept of ME sensor 108. An ME sensor is also referred to as, among other things, an ME device or an ME element. ME sensor 108 is made of a magnetostrictive material 116 and a piezoelectric material 118. FIG. 2 is intended for illustrating a general concept and not for illustrating a particular structure or configuration. When a magnetic field (H) is applied to ME sensor 108, magnetostrictive material 116 deforms and thereby stresses piezoelectric material 118, which in response generates an electrical current (I) at a voltage V. In one embodiment, piezoelectric material 118 also generates an electrical signal when a pressure is applied to ME sensor 108, thereby allowing ME sensor 108 to be used as a touch sensor in additional to a magnetic sensor.

Figure 3:
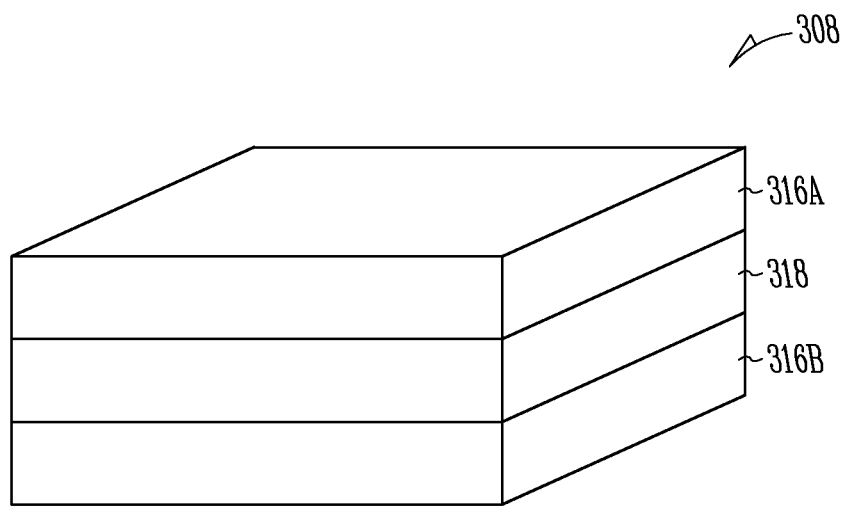
FIG. 3 is an illustration of an embodiment of the ME sensor.

FIG. 3 is an illustration of an embodiment of an ME sensor 308. ME sensor 308 represents an embodiment of ME sensor 108 and includes a piezoelectric layer 318 sandwiched between two magnetostrictive layers 316A-B. An example of MR sensor 308 is a "Magnetostrictive Electroactive Wireless Power Transfer (ME WPT)" element provided by Ferro Solutions, Inc. (5 Constitution Way, Woburn, Mass. 01801), which provides a power density of 2 W/cm$^3$ with a device thickness of 0.04 cm.

Figure 4:
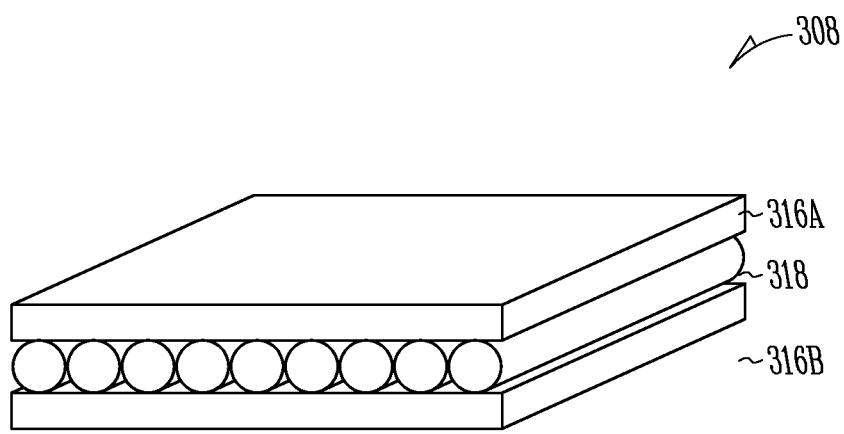
FIG. 4 is an illustration of another embodiment of the ME sensor.

FIG. 4 is an illustration of an embodiment of an ME sensor 408. ME sensor 408 represents an embodiment of ME sensor 308 and includes a piezoelectric layer 418 sandwiched between two magnetostrictive layers 416A-B, where piezoelectric layer 418 is formed by fibers made of a piezoelectric material, and magnetostrictive layers 416A-B are semi-rigid solid sheets made of a magnetostrictive material.

FIGS. 3 and 4 show ME sensor examples that are intended to be illustrative but not restrictive. In various embodiments, ME sensor 108 includes at least one magnetostrictive layer and at least one piezoelectric layer arranged to generate an electric signal when ME sensor 108 is subjected to a magnetic field. In various embodiments, ME sensor 108 is made of magnetostrictive and piezoelectric materials arranged in any way that allows the magnetostrictive material to deform in response to a magnetic field and thereby stress the piezoelectric material into generating an electrical signal. In various embodiments, the magnetostrictive and piezoelectric materials are also arranged in a way that allows the piezoelectric material to be stressed into generating an electrical signal in response to a mechanical pressure applied onto ME sensor 108. In one embodiment, the magnetostrictive and/or piezoelectric layers are each constructed a semi-rigid solid sheet and/or a sheet formed with fibers.

In various embodiments, ME sensor 108 being a replacement of the secondary coil of an inductive couple and/or a telecoil has significant structural and functional advantages over the secondary coil and/or the telecoil. For example, ME sensor 108 when being constructed as a planar element may be formed into various shapes, which when combined with its thin cross-section allows placement in areas that would not accommodate the secondary coil and/or the telecoil. ME sensor 108 also has properties creating a flux guide that channels magnetic lines of forces, so its operation is less sensitive to its direction relative to the magnetic field when compared to the secondary coil and/or telecoil. Some other advantages are seen in the examples discussed below in this document.

Figure 5:
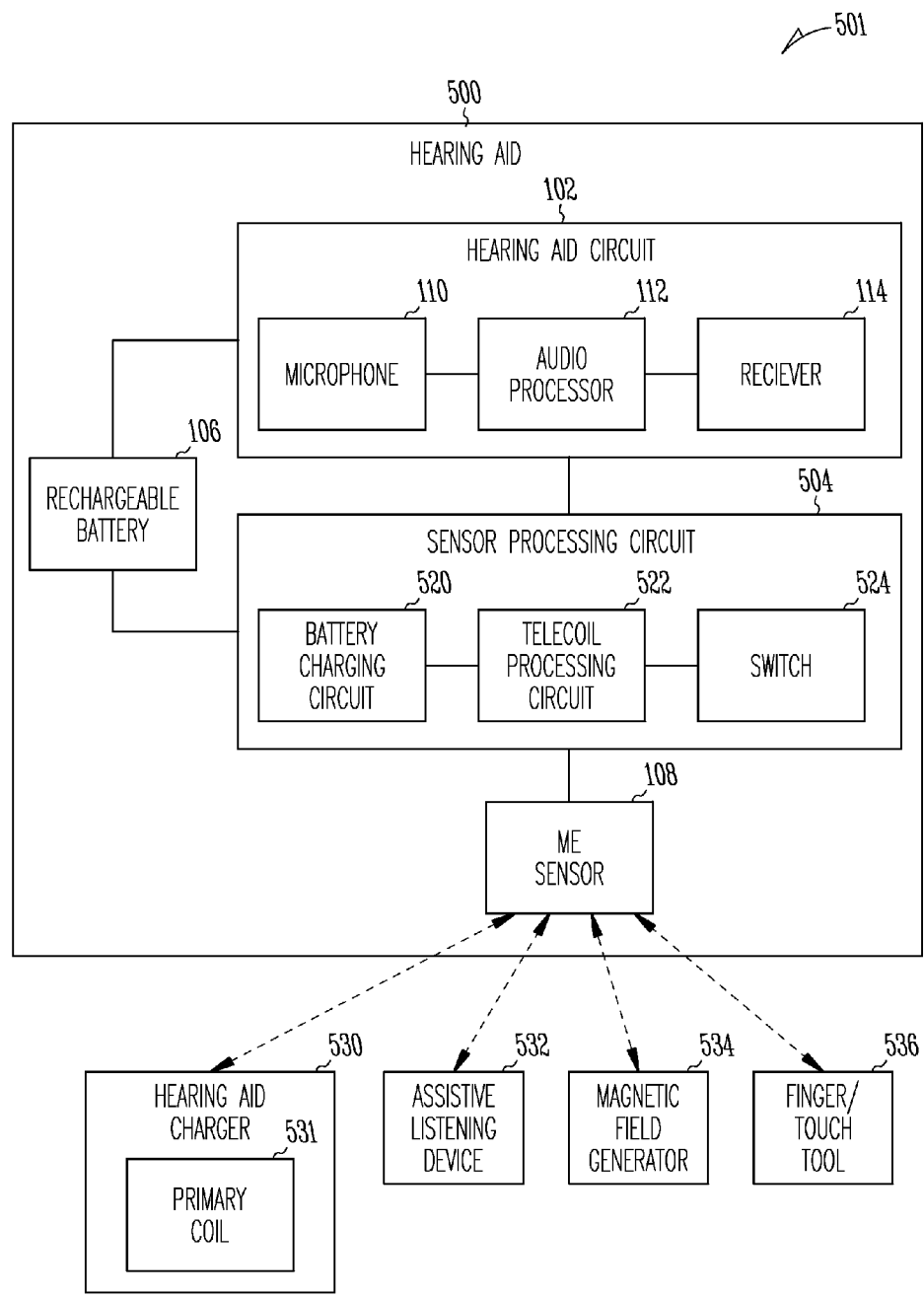
FIG. 5 is a block diagram illustrating an embodiment of a hearing assistance system including the hearing aid.

FIG. 5 is a block diagram illustrating an embodiment of a hearing assistance system 501 including a hearing aid 500 and other devices including a hearing aid charger 530, an assistive listening device 532, a magnetic field generator 534, and a touch tool 536. In one embodiment, the user's finger is used in place of touch tool 536. Hearing aid 500 represents an embodiment of hearing aid 100 and includes hearing aid circuit 102, a sensor processing circuit 504, rechargeable battery 106, and MR sensor 108.

In the illustrated embodiment, ME sensor 108 generates an power signal in response to a power magnetic field generated by hearing aid charger 530, a sound signal in response to a sound magnetic field generated by assistive listening device 532, and a driving signal in response to a command magnetic field generated by magnetic field generator 534 or a command pressure applied using the finger or touch tool 536. The power signal, sound signal, and driving signal are electrical signals that are distinguishable using their characteristics and/or timing. Sensor processing circuit 504 represents an embodiment of sensor processing circuit 104 and includes a battery charging circuit 520 to charge rechargeable battery 106 using the power signal, a sound processing circuit 522 to process the sound signal for recovering a sound, and a switch 524 to control operation of hearing aid circuit 102 using the driving signal. In various other embodiments, ME sensor 108 is used to generate any one or more of the power signal, the sound signal, and the driving signal. Accordingly, sensor processing circuit 504 includes any one or more of battery charging circuit 520, sound processing circuit 522, and switch 524.

Hearing aid charger 530 includes a primary coil 531 to generate the power magnetic field. Primary coil 531 is driven by a coil driver circuit including a power amplifier. In one embodiment, a tuning circuit is provided between primary coil 531 and the coil driver. In one embodiment, hearing aid charger 530 is powered using a household AC power line.

Assistive listening device 532 generates the sound magnetic field. In various embodiments, assistive listening device 532 represents any device that generates the sound magnetic field being a magnetic field representing a sound. Examples of assistive listening device 532 include a hearing aid compatible telephone or a hearing aid compatible device of an assistive listening system in an auditorium.

Magnetic field generator 534 generates the command magnetic field. The user issues a command by applied the command magnetic field to hearing aid 500. In one embodiment, magnetic field generator 534 includes a magnet. The user issues a command by bringing the magnet to close proximity of hearing aid 500. In another embodiment, as illustrated in FIG. 5, magnetic field generator 534 includes command input 535 that allows the user to key in commands. Magnetic field generator 534 includes an electromagnet that generates a command magnetic field that is modulated by data representing the commands. In response to this command magnetic field, ME sensor 108 generates a driving signal that includes data representing the commands. Switch 524 includes a command receiver 525 that receives the data representing the commands, and controls the operation of hearing aid circuit 102 according to the received commands. The user's finger or touch tool 536 are used to apply the command pressure to hearing aid 500. In one embodiment, the user issues a command by touching hearing aid 500, or a specified portion of hearing aid 500, using a finger. In another embodiment, touching tool 536 is provided to allow for better access to hearing aid 500 when needed.

Figure 6:
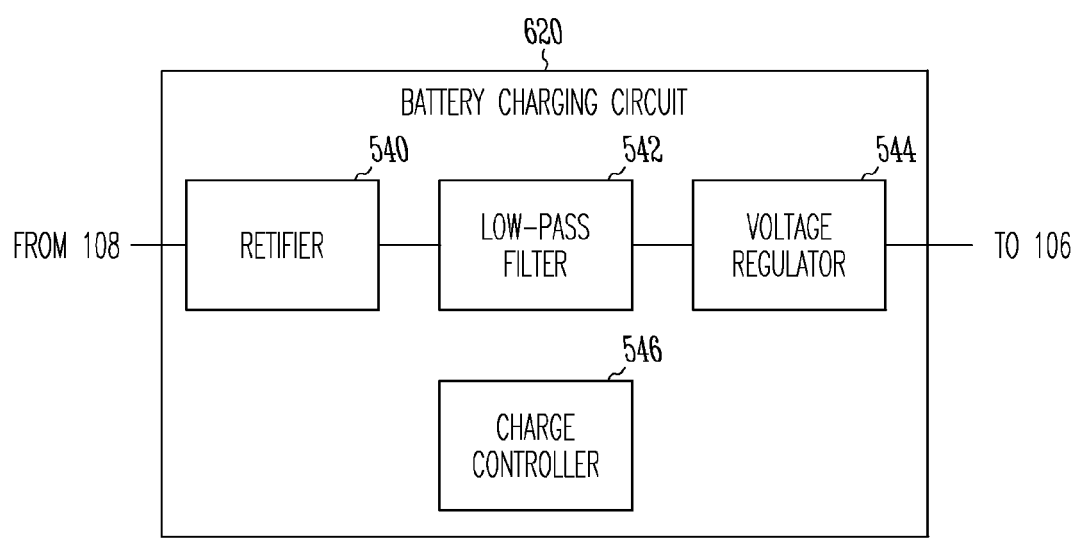
FIG. 6 is a block diagram illustrating an embodiment of a battery charging circuit of the hearing aid.

FIG. 6 is a block diagram illustrating an embodiment of a battery charging circuit 620. Battery charging circuit 620 represents an embodiment of battery charging circuit 520 and includes a rectifier 540, a low-pass filter 542, a voltage regulator 544, and optionally a charge controller 546. The power magnetic field is an AC magnetic field, and the power signal is an AC signal. Battery charging circuit 620 converts this AC signal to a DC signal suitable for charging rechargeable battery 106. Rectifier 540 rectifies the power signal. Low-pass filter 542 converts the power signal to a signal with a substantial DC component. Voltage regulator 544 limits the output voltage of battery charging circuit 520 to a level suitable for charging rechargeable battery 106. In one embodiment, charging controller 546 controls the operation of battery charging circuit 620, such as whether and when to charge rechargeable battery for its optimal performance.

Figure 7:
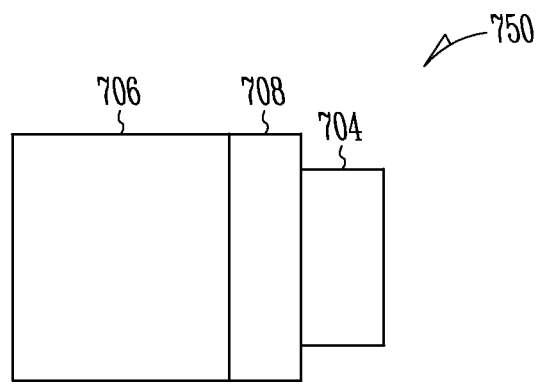
FIG. 7 is an illustration of an embodiment of a rechargeable battery assembly.

FIG. 7 is an illustration of an embodiment of a rechargeable battery assembly 750. Rechargeable battery assembly 750 integrates a rechargeable battery 706, an ME sensor 708, and a sensor processing circuit 704 into a single device. Rechargeable battery 706 represents an embodiment of rechargeable battery 106. ME sensor 708 represents an embodiment of ME sensor 108 and is attached to rechargeable battery 106. Sensor processing circuit 704 represents an embodiment of sensor processing circuit 504 and includes at least battery charging circuit 620. Rechargeable battery assembly 750 is charged when being subjected to a magnetic field, without the need for a separate charging circuit. While such a rechargeable battery assembly can also be made with a secondary coil, use of ME sensor 708 allows rechargeable battery assembly 750 to be made into a smaller size and more desirable shape.

Figure 8:
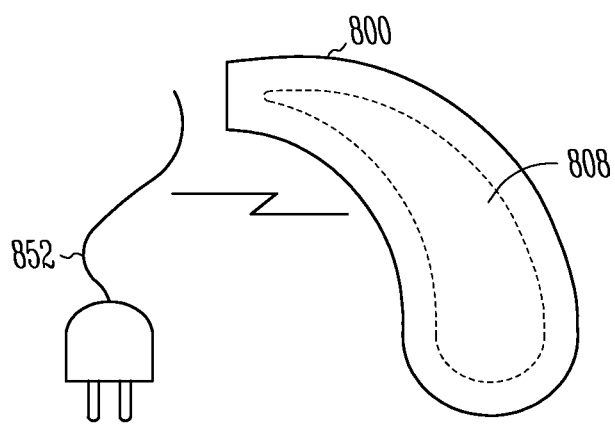
FIG. 8 is an illustration of an embodiment of the ME sensor configured as an energy harvester.

FIG. 8 is an illustration of an embodiment of an ME sensor 808 configured as an energy harvester. ME sensor 808 represents an embodiment of ME sensor 808 and is used to scavenge power from environmental magnetic fields, in place of or in addition to the power magnetic field generated from hearing aid charger 530. The planar nature of a ME sensor allows for a large-size sensor to conform to the housing of a device in which it is used. In the illustrated embodiment, ME sensor 808 is in a hearing aid 800, which represents an embodiment of hearing aid 100 and is configured as a BTE device. In various embodiments, ME sensor 808 is used in any type hearing aid that allows for a sufficient size and shape for scavenging power from the environmental magnetic fields. In one embodiment, as illustrated in FIG. 8, ME sensor 808 is made large enough to be tuned to power line frequencies to scavenge power from the mains, such as household power lines carrying AC current of approximately 60 Hz.

Figure 9:
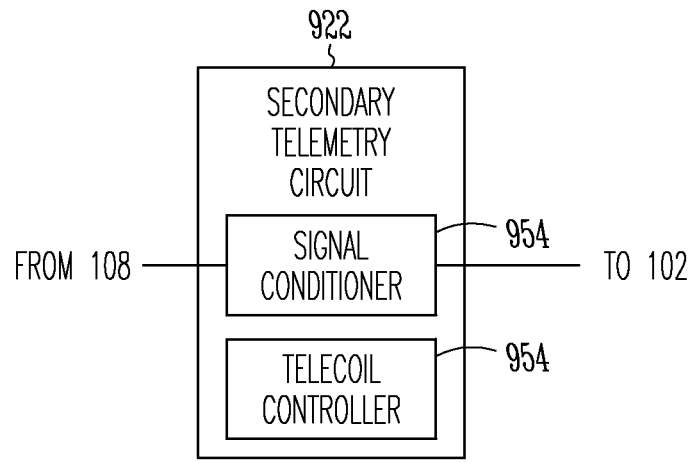
FIG. 9 is an illustration of an embodiment of a sound processing circuit of the hearing aid.

FIG. 9 is an illustration of an embodiment of a sound processing circuit 922, which represents an embodiment of sound processing circuit 522. In this embodiment, ME sensor 108 senses a magnetic signal representing a sound and, in response, generates an electrical signal representing the sound. In the illustrated embodiment, sound processing circuit 922 includes a signal conditioner 954 and a sound processing controller 958. Signal conditioner 954 conditions the sound signal generated by ME sensor 108 and transmits the conditioned sound signal to hearing aid circuit 102 to be recovered as the sound represented by the sound magnetic field for delivering by receiver 114 to the ear canal of the wearer. Sound processing controller 958 controls the operation of sound processing circuit 922, such as the timing for ME sensor 108 to function as a magnetic sensor that senses the magnetic signal representing the sound. In one embodiment, sound processing controller 958 generates a signal to turn off microphone 110 when the sound magnetic field is being sensed by ME sensor 108, such that the wearer hears the sound represented by the sound magnetic field but not acoustic noises.

Figure 10:
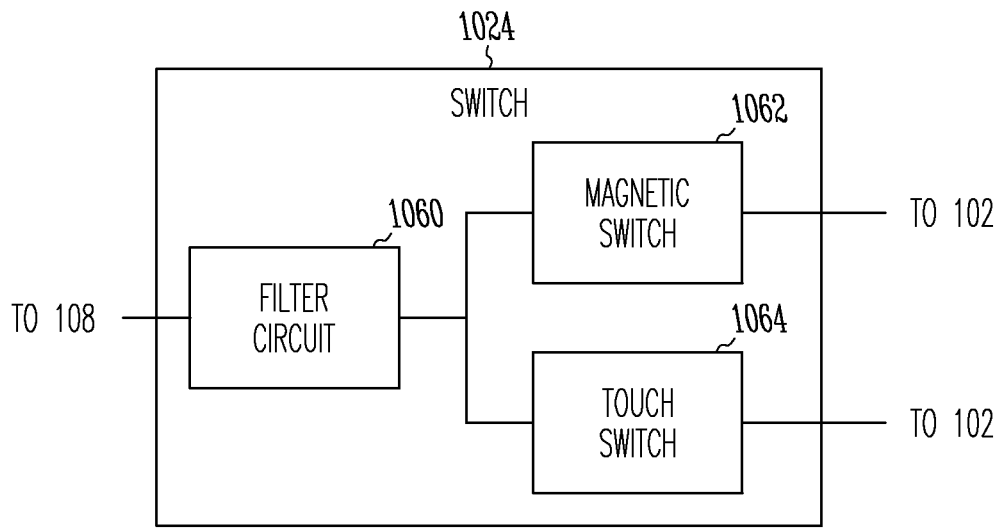
FIG. 10 is an illustration of an embodiment of a switch of the hearing aid.

FIG. 10 is an illustration of an embodiment of a switch 1024, which represents an embodiment of switch 524. In the illustrated embodiment, switch 524 includes a filter circuit 1060, a magnetic switch 1062, and a touch switch 1064. Filter circuit 1060 allows for isolation of the driving signal from the power and/or sound signals that may be simultaneously present. In various embodiments, switch 524 includes either or both of magnetic switch 1062 and touch switch 1064, and filter circuit 1060 if needed.

Switch 1024 controls operation of hearing aid circuit 102 using the driving signal, which is generated by ME sensor 108 in response to the command magnetic field and/or the command pressure. An advantage of using ME sensor 108 to generate the driving signal is that the ME sensor does not need a power supply to operate. Magnetic switch 1062 is driven by the driving signal generated by ME sensor 108 in response to the command magnetic field. In one embodiment, the command magnetic field is a DC magnetic field from a magnet. In another embodiment, the command magnetic field is a magnetic field generated by an electromagnet and modulated by data representing user commands. In one embodiment, magnetic switch 1062 changes its state in response to the driving signal being present for at least a specified duration, which indicates that the command magnetic field is present for at least approximately the specified duration. Touch switch 1064 is driven by the driving signal generated by ME sensor 108 in response to the command pressure. In one embodiment, touch switch 1064 changes its state in response to the driving signal being present for at least a specified duration, which indicates that the command pressure is applied for at least approximately the specified duration. When switch 1024 includes both magnetic switch 1062 and touch switch 1064, the driving signal generated by ME sensor 108 includes two distinguishable components corresponding to the command magnetic field and the command pressure. Including both magnetic switch 1062 and touch switch 1064 allows the user to issue a first type command by bringing magnetic field generator 534 to the proximity of hearing aid 500 and issue a second type command by touching a portion of hearing aid 500. In one embodiment, hearing aid 500 is turned on or off when magnetic switch 1062 changes its state, and changes its volume setting when touch switch 1064 changes its state. In another embodiment, hearing aid 500 is turned on or off when touch switch 1064 changes its state, and changes its volume setting when magnetic switch 1062 changes its state.

Figure 11A:
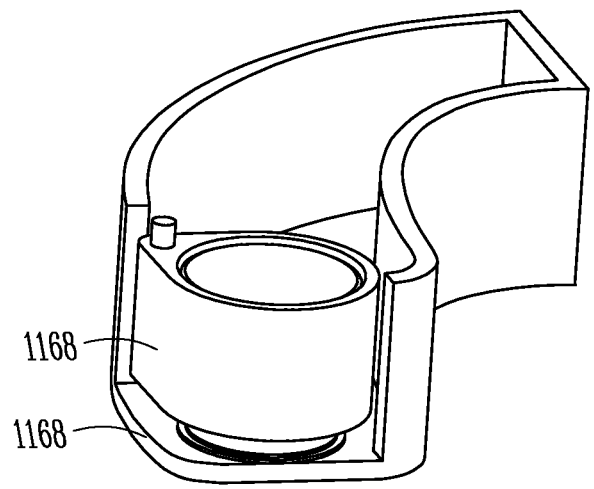
FIGS. 11A-B are illustrations of an embodiment of placement of the ME sensor in a hearing aid.
Figure 11B:
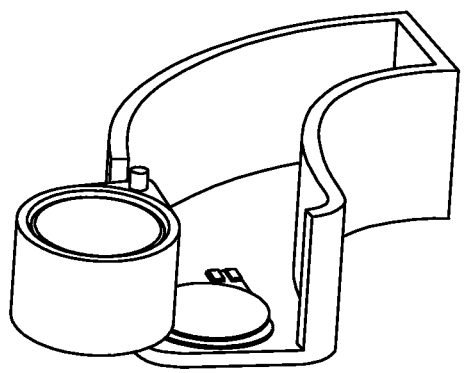

FIGS. 11A-B are illustrations of an embodiment of placement of an ME sensor 1108 in a hearing aid 1100. ME sensor 1108 represents an embodiment of ME sensor 108 and is shaped to be placed in a battery compartment 1168, adjacent to a rechargeable battery 1106, of hearing aid 1100, which as illustrated is a BTE device. Rechargeable battery 1106, which represents an embodiment of rechargeable battery 106, is placed in a rotatable battery container 1166. FIG. 11A shows hearing aid 1100 with battery compartment 1168 closed as it is ready for use. FIG. 11B shows hearing aid 1100 with battery compartment 1168 open as battery container 1166 swings out to allow for replacement of rechargeable battery 1106 when necessary.

Figure 12A:
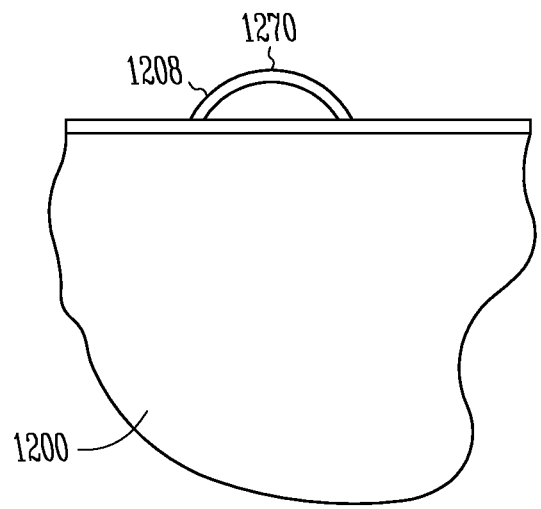
FIGS. 12A-B are illustrations of another embodiment of placement of the ME sensor in a hearing aid.
Figure 12B:
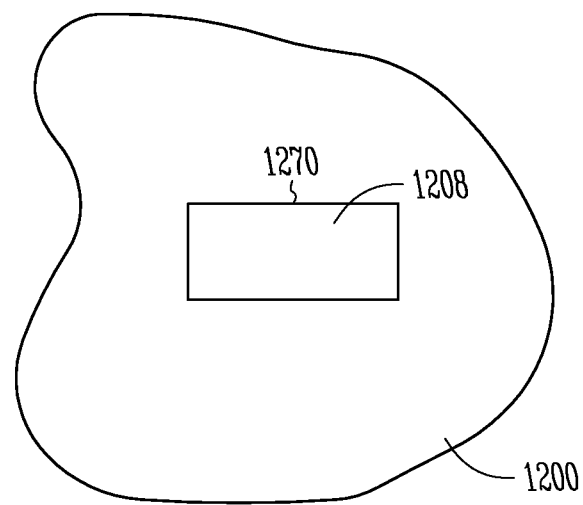

FIGS. 12A-B are illustrations of an embodiment of placement of an ME sensor 1208 in a hearing aid 1200, with FIG. 12A showing a side view and FIG. 12B showing a top view. ME sensor 1208 represents an embodiment of ME sensor 108 and is incorporated into, or forms, a battery door of hearing aid 1200, which for example is an ITE device.

FIGS. 11A-B and 12A-B are examples presented for illustrative purposes only, in various embodiments, the thin and planar nature of an ME sensor provides for great flexibility in designing a hearing aid for desirable size and shape without compromising functionality. When compared to the secondary coil in an inductive couple, the ME sensor provides not only smaller size and greater flexibility, but also additional functions not feasible with the secondary coil.

Figure 13:
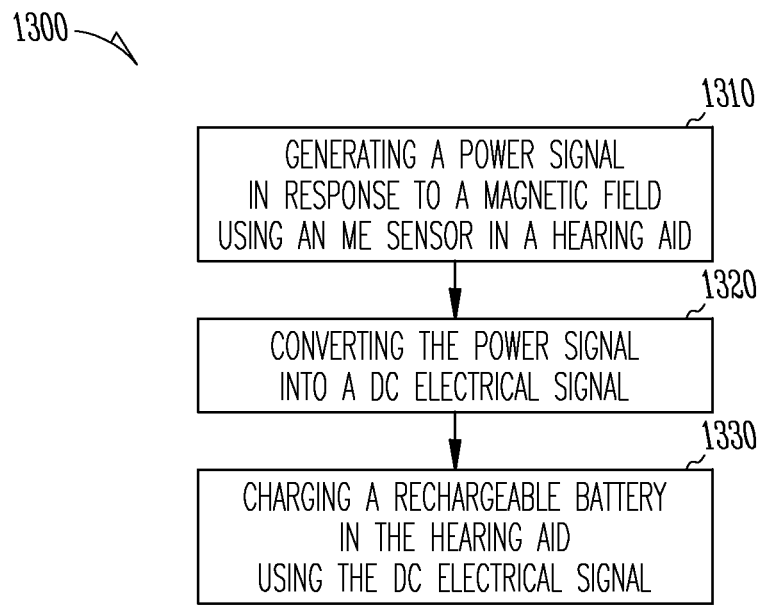
FIG. 13 is a flow chart illustrating an embodiment of a method for powering a hearing aid using an ME sensor.
Figure 14:
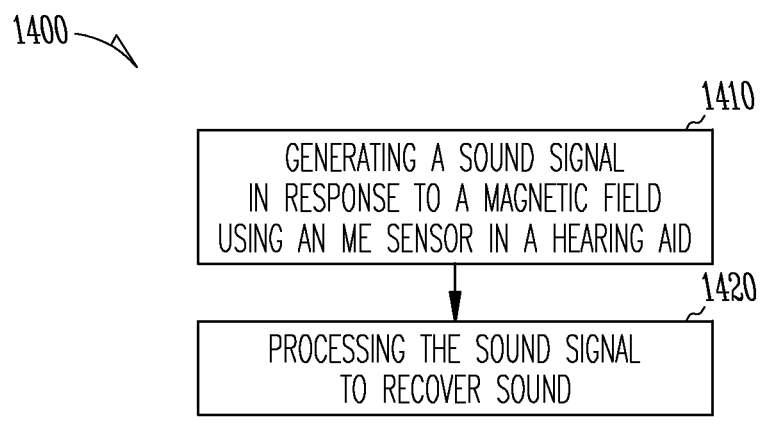
FIG. 14 is a flow chart illustrating an embodiment of a method for communicating to a hearing aid using an ME sensor.
Figure 15:
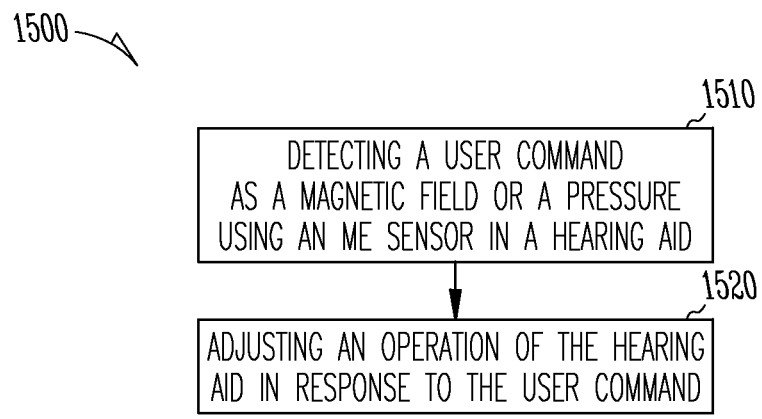
FIG. 15 is a flow chart illustrating an embodiment of a method for receiving a user command adjusting a hearing aid using an ME sensor.

FIGS. 13-15 illustrate methods for using an ME sensor in a hearing aid. In various embodiments as illustrated in FIGS. 13-15, the ME sensor includes ME sensor 108, including its various embodiments as discussed in this document, and the hearing aid includes hearing aid 100, including its various embodiments as discussed in this document. In various embodiments, these methods are each used alone or in any combination determined to be suitable for a hearing aid.

FIG. 13 is a flow chart illustrating an embodiment of a method 1300 for powering a hearing aid using an ME sensor in the hearing aid. At 1310, a power signal is generated in response to a magnetic field using the ME sensor. In one embodiment, the power signal is generated using the ME sensor in response to a magnetic field generated by a hearing aid charger using a coil. The coil and the ME sensor are closely coupled over a narrow air gap when the hearing aid is placed into the charger base of the hearing aid charger. In another embodiment, the power signal is generated by using the ME sensor to scavenge power from environmental magnetic fields. In one embodiment, such from environmental magnetic fields include magnetic fields generated by power lines carrying AC current of approximately 50 Hz, 60 Hz, or other standard frequency in the country or region where the hearing aid is to be used. At 1320, the power signal is converted into a DC electrical signal. In one embodiment, the power signal is rectified, low-pass filtered, and voltage-regulated to be converted to a DC signal with a voltage suitable for charging a rechargeable battery in the hearing aid. At 1330, the rechargeable battery is charged using the DC electrical signal.

FIG. 14 is a flow chart illustrating an embodiment of a method 1400 for magnetically transmitting a sound to a hearing aid using an ME sensor in the hearing aid. At 1410, a sound signal is generated in response to a magnetic field using the ME sensor. The ME sensor functions as a telecoil. The magnetic field represents the sound and is generated from a hearing aid compatible telephone or other type assistive listening device. At 1420, the sound signal is processed to recover the sound for delivery to the wearer's ear canal.

FIG. 15 is a flow chart illustrating an embodiment of a method 1500 for receiving a user command adjusting a hearing aid using an ME sensor in the hearing aid. The ME sensor may function as a sensor being part of a user interface allowing the user to control the operation of the hearing aid, such as turning the hearing aid on and off and adjusting the volume of the sound delivered to the ear canal. At 1510, the user command is detected as a magnetic field or a pressure using the ME sensor. In response to the detection, a driving signal is generated using the ME sensor. In one embodiment, the driving signal is generated in response to a magnetic field representing the user command. The magnetic field is generated using a hand-held magnetic field generator such as a magnet or a tool including a magnet that is provided to the user. In one embodiment, the driving signal is generated in response to the magnetic field representing the user command being detected for at least a specified duration. This prevents the driving signal from being generated in response to magnetic fields that are not intended to be the user commands. When the ME sensor is also used to generate the power signal and/or the sound signal, the magnetic field representing the user command is different from the magnetic field(s) used to transmit power and/or sound, such that the driving signal can be isolated from the power signal and/or the sound signal to drive a switch controlling an operation of the hearing aid. In another embodiment, the driving signal is generated in response to a mechanical pressure representing the user command. The mechanical pressure is applied to the ME sensor when the user touches the hearing aid or a specified portion of the hearing aid using a finger or a touch tool. In one embodiment, the driving signal is generated in response to the mechanical pressure representing the user command being detected for at least a specified duration. This prevents the driving signal from being generated in response to the hearing aid being unintentionally touched. When the ME sensor is also used to generate the power signal and/or the sound signal, the driving signal is isolated from the power signal and/or the sound signal to drive a switch controlling an operation of the hearing aid. In one embodiment, the driving signal includes different components that are generated using the ME sensor separately in response to the magnetic field and the mechanical pressure. This allows the ME sensor to be used to detect multiple types of user commands. In one embodiment, the ME sensor is used to detect a first type command issued by the user by bringing a magnet to the proximity of the hearing aid and a second type command issued by the user by touching the hearing aid. At 1520, an operation of the hearing aid is adjusted in response to the user command. This includes changing a state of a switch in the hearing aid, which in turn adjusts the operation. In one embodiment, the hearing aid is turned on or off in response to the user command. In another embodiment, the sound volume of the hearing aid is adjusted in response to the user command. In one embodiment in which the ME sensor is used to detect multiple types of user commands, the hearing aid is turned on or off in response to the magnet brought to the proximity of the hearing aid, and the receiver volume is adjusted in response to the hearing aid being touched in a specified manner.

In various embodiments, any one or more of methods 1300, 1400, and 1500 are used as needed and suitable for a hearing aid. Additionally, while the ME sensor in a hearing aid is specifically discussed, the apparatus and method as discussed above are generally applicable to any device providing for cordless charging of its rechargeable battery, magnetic sound transmission, and/or switching by magnet or touch.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing aid, comprising:
   a hearing aid circuit including a microphone, a receiver, and an audio processor coupled between the microphone and the receiver;
   a rechargeable battery coupled to the hearing aid circuit to power the hearing aid circuit;
   a magnetostrictive electroactive (ME) sensor configured to generate a power signal in response to a first magnetic field and generate a driving signal in response to a second magnetic field or a pressure; and
   a sensor processing circuit coupled to the ME sensor, the sensor processing circuit including:

a battery charging circuit coupled to the rechargeable battery and configured to charge the rechargeable battery using the power signal; and a switch coupled to the hearing aid circuit and configured to control the hearing aid circuit using the driving signal.

2. The hearing aid of claim 1, comprising a housing encapsulating at least the hearing aid circuit and the sensor processing circuit.

3. The hearing aid of claim 2, wherein the ME sensor is encapsulated in the housing.

4. The hearing aid of claim 2, wherein the ME sensor is incorporated into the housing.

5. The hearing aid of claim 4, wherein the housing comprises a battery door, and the ME sensor is incorporated into the battery door.

6. The hearing aid of claim 1, wherein the ME sensor comprises two magnetostrictive layers and a piezoelectric layer sandwiched between the two magnetostrictive layers.

7. The hearing aid of claim 1, wherein the ME sensor is configured to scavenge power from environmental magnetic fields.

8. The hearing aid of claim 7, wherein the ME sensor is configured to scavenge power from magnetic fields generated by electric power lines.

9. The hearing aid of claim 1, wherein the ME sensor is configured to generate a sound signal in response to a third magnetic field representing a sound, and the sensor processing circuit comprises a sound processing circuit configured to process the sound signal to recover the sound from the sound signal.

10. The hearing aid of claim 1, wherein the switch comprises a magnetic switch driven by the driving signal, and the ME sensor is configured to generate the driving signal in response to the command magnetic field applied on the ME sensor for at least a specified duration.

11. The hearing aid of claim 1, wherein the command magnetic field is modulated by data representative of user commands, the ME sensor is configured to generate the driving signal in response to the command magnetic field applied on the ME sensor, the driving signal including the data representative of the user commands, and the switch is configured to control the hearing aid circuit according to the user commands.

12. The hearing aid of claim 1, wherein the switch comprises a touch switch driven by the driving signal, and the ME sensor is configured to generate the driving signal in response to a mechanical pressure applied on the ME sensor for at least a specified duration.

13. A method for operating a hearing aid powered by a rechargeable battery, the method comprising:

generating a power signal in response to a first magnetic field applied to the hearing aid using a magnetostrictive electroactive (ME) sensor in the hearing aid;

converting the power signal into a DC electrical signal;

charging the rechargeable battery using the DC electrical signal;

detecting a user command as a second magnetic field or a pressure applied to the hearing aid using the ME sensor; and adjusting an operation of the hearing aid in response to the user command.

14. The method of claim 13, comprising generating the power signal using the ME sensor in response to a magnetic field generated by a hearing aid charger using a coil.

15. The method of claim 13, comprising generating the power signal by scavenging power from environmental magnetic fields using the ME sensor.

16. The method of claim 15, wherein scavenging the power from the environmental magnetic fields comprises scavenging power from magnetic fields generated by power lines carrying AC current of approximately 60 Hz.

17. The method of claim 13, further comprising generating a sound signal in response to a third magnetic field representing a sound, and processing the sound signal to recover the sound.

18. The method of claim 13, comprising generating a driving signal suitable for driving a switch in the hearing aid in response to the second magnetic field using the ME sensor.

19. The method of claim 18, wherein generating the driving signal comprises generating the driving signal in response to presence of a magnet in proximity of the hearing aid.

20. The method of claim 18, wherein the second magnetic field is modulated by data representative of the user command, and generating the driving signal comprises generating a driving signal including the data representative of the user command in response to the second magnetic field being applied to the hearing aid using an electromagnet.

21. The method of claim 13, comprising generating a driving signal suitable for driving a switch in the hearing aid in response to the pressure using the ME sensor.

22. The method of claim 21, wherein generating the driving signal comprises generating the driving signal in response to a portion of the hearing aid being touched.

23. The method of claim 13, comprising turning the hearing aid on or off in response to the user command.

24. The method of claim 13, comprising adjusting sound volume of the hearing aid in response to the user command.

25. A hearing aid, comprising:

a hearing aid circuit including a microphone, a receiver, and an audio processor coupled between the microphone and the receiver;

a rechargeable battery coupled to the hearing aid circuit to power the hearing aid circuit;

a magnetostrictive electroactive (ME) sensor configured to scavenge power from magnetic fields generated from electric power lines carrying AC current having a power line frequency of approximately 60 Hz and generate a power signal using the scavenged power, the ME sensor tuned to the power line frequency; and a battery charging circuit coupled to the rechargeable battery and the ME sensor, the battery charging circuit configured to charge the rechargeable battery using the power signal.

26. The hearing aid of claim 25, wherein the ME sensor comprises two magnetostrictive layers and a piezoelectric layer sandwiched between the two magnetostrictive layers.

27. The hearing aid of claim 26, further comprising a sound processing circuit coupled to the hearing aid circuit and the ME sensor, the sound processing circuit configured to receive a sound magnetically transmitted to the hearing aid, wherein the ME sensor is configured to generate a sound signal in response to a magnetic field representing the sound, and the sound processing circuit comprises a signal conditioner configured to condition the sound signal for recovering the sound.

* * * * *